United States Patent Office 2,779,765
Patented Jan. 29, 1957

2,779,765

STABILIZATION OF PYRROLE

Harry B. Copelin and Antoinette Sledd, Niagara Falls, N. Y., assignors to E. I. du Pont de Nemours and Company, Wilmington, Del., a corporation of Delaware No Drawing. Application August 29, 1955,
Serial No. 531,285

5 Claims. (Cl. 260—313)

This invention relates to the stabilization of pyrrole and substituted pyrroles. In one aspect, an object of the invention is provision of a new and useful method of stabilizing the pyrroles. In another aspect, an object is provision of the stabilized pyrroles themselves.

One of the difficulties encountered in the commercial utilization of pyrroles is the tendency of these compounds to undergo oxidation upon exposure to air, particularly in the presence of sunlight. Oxidation forms colored products which increase the acidity of and necessitate redistilling the pyrrole. Discoloration may even occur under storage conditions where very little air is present.

It has now been found that decomposition from air-oxidation can be greatly retarded or repressed by the addition to the pyrrole of small amounts of certain amines. These amines are the alkanol amines in which the carbon chains contain up to about 6 carbon atoms. Secondary and tertiary amines and compounds containing branched chains are acceptable. The preferred amine, in fact, is diisopropanolamine. Other satisfactory alkanol amines are ethanol- and diethanolamines, triisopropanolamine, hexanolamine and the like.

Trace amounts, i. e., around 0.01% by weight of amine, are effective but larger amounts up to about 0.1–0.5% by weight give more protection. Still larger quantities, i. e., up to 1% can be used but are unnecessary.

The amine can be added directly to the pyrrole in any desired quantity. Another method of supplying the material, however, is effective, particularly with diisopropanolamine. This method consists in adding the stabilizer to crude pyrrole before the final distillation to form the commercial product is carried out and then distilling the mixture. A trace of the amine is distilled over with the pyrrole and provides sufficient protection for ordinary purposes.

The utility of this invention is not limited to pyrrole alone. The stabilizers can, in fact, be utilized both with pyrrole itself and its N-alkylated derivatives. These derivatives include N-methyl, N-ethyl and like substituted compounds.

There follow some examples which serve to illustrate the invention. In these examples all percentages are given in terms of weight. The pH determinations recorded were made by evaporating 20 cc. portions of the pyrrole to dryness under an infrared lamp, dissolving the residue in 20 cc. of water and taking the pH of the resulting solution at room temperature on a Beckman pH meter.

Example 1 a. To a series of samples of freshly distilled pyrrole were added 0.1% by weight of diisopropanolamine. The pH of water extracts of the samples was about 11.5–12. The samples were sealed and allowed to stand. The pH of the samples was again taken at the end of about six months. Results are given in Table I.

TABLE I
pH of pyrrole samples with 0.1% diisopropanolamine

| Sample | pH | Sample | pH |
|---|---|---|---|
| 1 | 11.5 | 6 | 11.4 |
| 2 | 11.3 | 7 | 11.3 |
| 3 | 11.4 | 8 | 11.4 |
| 4 | 11.3 | 9 | 11.6 |
| 5 | 11.3 | 10 | 11.4 | b. By way of comparison, several samples of freshly distilled pyrrole were sealed and stored for about six months without any stabilizer. The pH of solutions of the residues averaged about 5.

Example 2

To crude pyrrole was added 0.1% by weight of diisopropanolamine. The crude material was distilled at ambient pressure to give a product containing only a trace of the stabilizer, i. e., around 0.01% or even less. Samples of the product were sealed and stored for about six months under the conditions of the samples of Example 1a. The pH of the residues is shown in Table II.

TABLE II
pH of pyrrole samples with traces of diisopropanolamine

| Sample | pH | Sample | pH |
|---|---|---|---|
| 11 | 6.3 | 16 | 6.2 |
| 12 | 6.3 | 17 | 6.2 |
| 13 | 6.7 | 18 | 6.1 |
| 14 | 6.5 | 19 | 6.4 |
| 15 | 6.2 | 20 | 6.4 |

Example 3

Light-stability tests were run on pyrrole stabilized with various alkanol amines as follows:

a. 0.1% of N,N-dibutylpentanolamine was added to freshly distilled pyrrole. After one week's exposure to light and air this sample was light yellow in color. A control sample subjected to the same conditions was very dark.

b. 0.7% of diethanolamine was added to freshly distilled pyrrole. After 2 weeks this sample was light yellow while the control was deep amber.

c. 0.5% triethanolamine was added to freshly distilled pyrrole. After 9 days this sample was practically colorless while the control was quite yellow.

Having described our invention, we claim:

1. The method of stabilizing a member of the group consisting of pyrrole and its N-alkylated derivatives which comprises supplying thereto an effective stabilizing amount of an alkanolamine in which the carbon chains contain between 1 and 6 carbon atoms.

2. The method of stabilizing pyrrole against the decomposition to acidic products caused by air and light which comprises supplying thereto between a trace and up to about 0.5% by weight of diisopropanolamine.

3. The method of stabilizing pyrrole against the decomposition to acidic products caused by air and light which comprises supplying to crude pyrrole about 0.1–0.5% by weight of diisopropanolamine and distilling the crude material under ambient pressure conditions to a refined pyrrole.

4. Pyrrole carrying an effective stabilizing amount of an alkanolamine in which the carbon chains contain between 1 and 6 carbon atoms.

5. Pyrrole carrying between about 0.01 and 0.5% by weight of diisopropanolamine and thereby stabilized against air and light decomposition to acidic products.

No references cited.